US008418354B2

(12) United States Patent
Young

(10) Patent No.: US 8,418,354 B2
(45) Date of Patent: Apr. 16, 2013

(54) APPARATUS FOR FRAME FABRICATION

(75) Inventor: Graeme Laurence Young, Hamilton (NZ)

(73) Assignee: Paslode New Zealand, Glenfield (NZ)

(*) Notice: Subject to any disclaimer, the term of this patent is extended or adjusted under 35 U.S.C. 154(b) by 897 days.

(21) Appl. No.: 12/067,083

(22) PCT Filed: Sep. 19, 2006

(86) PCT No.: PCT/IB2006/002595
§ 371 (c)(1), (2), (4) Date: Mar. 17, 2008

(87) PCT Pub. No.: WO2007/034293
PCT Pub. Date: Mar. 29, 2007

(65) Prior Publication Data

US 2008/0251564 A1 Oct. 16, 2008

(30) Foreign Application Priority Data

Sep. 20, 2005 (NZ) ........................................ 542508

(51) Int. Cl.
*B23P 19/00* (2006.01)

(52) U.S. Cl.
USPC ................ 29/798; 29/430; 29/281.4; 29/559; 29/432; 29/281.1; 81/23; 227/110; 227/8

(58) Field of Classification Search .................... 29/429, 29/798, 430, 432, 281.1, 281.5, 559; 81/23; 227/110, 8
See application file for complete search history.

(56) References Cited

U.S. PATENT DOCUMENTS

| | | | | |
|---|---|---|---|---|
| 2,127,209 | A | | 8/1938 | Duchan |
| 2,952,164 | A | | 9/1960 | Hofgesang |
| 3,399,445 | A | | 9/1968 | Carroll |
| 3,410,620 | A | | 11/1968 | Howard |
| 3,623,646 | A | | 11/1971 | Cast et al. |
| 3,688,965 | A | | 9/1972 | Kellner et al. |
| 3,848,791 | A | | 11/1974 | Jureit et al. |
| 3,912,924 | A | | 10/1975 | Barrett, Jr. |
| 4,031,604 | A | | 6/1977 | Jureit et al. |
| 4,037,771 | A | | 7/1977 | Peterson |
| 4,039,112 | A | * | 8/1977 | Schultz ........................... 227/40 |

(Continued)

FOREIGN PATENT DOCUMENTS

| | | | |
|---|---|---|---|
| DE | 4405648 | A1 | 8/1995 |
| JP | 09-141612 | A1 | 6/1997 |
| JP | 2003-136145 | A1 | 5/2003 |
| WO | 99/42253 | A1 | 8/1999 |

OTHER PUBLICATIONS

IST for PCT/IB2006/002603 dated May 21, 2007.
ISR for PCT/IB2006/002595 dated Feb. 6, 2007.
Office Action for JP2008-531806 mailed Jan. 10, 2012.

*Primary Examiner* — Peter DungBa Vo
*Assistant Examiner* — Azm Parvez
(74) *Attorney, Agent, or Firm* — Lowe Hauptman Ham & Berner, LLP

(57) ABSTRACT

An apparatus (1) for frame fabrication includes at least one nail gun (15) adapted to fire nails substantially in a selected plane of the frame (2). The nail gun (15) translates vertically and is configured with a control input device (19) activated by an operator which extends substantially across the width of the frame fabrication apparatus.

2 Claims, 13 Drawing Sheets

U.S. PATENT DOCUMENTS 4,546,528 A 10/1985 Langas
4,583,474 A 4/1986 Tysinger
5,249,352 A * 10/1993 Landers .......................... 29/432
5,544,600 A 8/1996 Hunt
5,669,209 A 9/1997 Dewees et al.
6,499,206 B1 * 12/2002 Eure et al. ........................ 29/430
2001/0046559 A1 11/2001 Hewitson
2006/0283105 A1 12/2006 Bertrand

* cited by examiner

APPARATUS FOR FRAME FABRICATION

RELATED APPLICATIONS

The present application is based on International Application Number PCT/IB2006/002595 filed Sep. 19, 2006, and claims priority from New Zealand Application Number 542508 filed Sep. 20, 2005, the disclosures of which are hereby incorporated by reference herein in their entirety.

TECHNICAL FIELD

The present invention relates to an apparatus for fabrication of frames in which plates or plate members are nailed to brace members separating opposite sides or end members. In particular, the invention relates to an apparatus for fabrication of wall frames in which such members are nailed together. Further, in preferred embodiments, it relates to an apparatus for fabrication of timber wall frames.

BACKGROUND ART

Buildings are often constructed with prefabricated sections such as walls, for example. The use of prefabricated walls allows for economies of scale from a production line to be brought to the construction of buildings.

Wall sections typically have top and bottom timber plates which are joined together by braces. These braces are typically fixed to the plates with nails that pass through the plates into the braces in the axis of the braces. Typically, two nails will be used for each brace. The braces are typically rectangular in cross-section and the two nails are separated by approximately one third of the length of the rectangular cross-section of the brace.

The frames are also typically fabricated while lying flat on a fabrication bed. Therefore, the two positions of nails which fix the brace to the plate will correspond to two different elevations above the fabrication bed.

GB 1202278 discloses a framing machine for use in constructing wall frames. The machine has a pair of pneumatically operated nail guns mounted on pivots at the side of the wall framing machine. The gun moves approximately vertically, but in an arc beside the frame. A vertical ram actuates the pivots to change the angle of the gun and the height at which the gun contacts a plate of the wall frame. The adjustment of the height of the nail gun at the plate allows a single gun to fire pairs of nails through the plate into a common brace.

U.S. Pat. No. 3,848,798 and U.S. Pat. No. 4,031,604 also relate to a machine for constructing wall frames in which plates are nailed with pairs of nails to braces. These documents also disclose a nail gun mounted on a pivot and actuated by a ram. In this case the pivot is parallel to the brace so the angle at which the nails are applied to the brace will be slightly off-parallel to the brace.

A problem with these apparatus is that while pivoting of a nail gun allows adjustment of the position of entry of nails into a brace, it suffers a problem that the nails will not be aligned with the brace. Instead, the nails will radiate from the pivot.

Another problem with these apparatus is that the pivot needs to be some distance from the frame being fabricated if the nail is not to be at too obtuse an angle of the axis of the brace. This pivot arrangement requires a considerable amount of space which places design constraints on the fabrication apparatus and may require a considerable amount of factory floor space.

Nail guns are typically used in the fabrication of wall sections as nail guns provide a very rapid nailing operation.

One way to supply a large number of nails to a nail gun, as is suitable for a production line situation, might be via a hose through which the nails pass. The hose would be supplied by a feeder which is in turn supplied by a bulk supply of loose nails which are vibrated or shaken in a 'tumbler'. The tumbler serves the purpose of rumbling or tumbling the nails into an alignment in which they fall down a feed shute for the hose. In this arrangement, the hose may require careful arrangement so that the flow of nails is not restricted, which can in turn place constraints on a design of the framing fabrication apparatus. The use of a nail feed hose may also place constraints on movement of the nail gun if the hose is to be unrestricted. Also, the 'tumbler' is likely to be large and bulky and this may also place constraints on the design of the apparatus.

Other types of nail guns might be supplied by a magazine of nails. A magazine may typically hold forty nails. This arrangement allows more flexibility in the design of framing fabrication apparatus and also allows ready adjustment of the position of the nail gun. However, a problem with magazine supplied nail guns is that the magazine may hold a relatively small amount of nails for production line applications. Frequent replacement of the magazines may be required.

Walls are typically constructed by adding braces, braces and other sections to the frame at one end. The frame is progressively moved away from that end as sections are added to the frame. Typically, roller supports are provided to support the frame at the outer edges by the plates. Rollers allow the frame to be moved easily.

Wall frames might be made of timber with various thicknesses. The variation in thicknesses may affect the spacing of nails in the braces if the apparatus is to cater for a range of timber thicknesses. For example, a framing apparatus adjusted to cater for a relatively thin timber will place the nails relatively close together in a relatively thick timber.

U.S. Pat. No. 3,873,015 discloses a machine for constructing wall frames. This machine provides two nails at different heights in the plate by having two nail guns at different points along the length of the frame. A brace is nailed to the plate by the first gun which is at a lower height, and then the brace is moved along to a second gun which is positioned at a higher point on a plate. However, the nail guns of this machine do not move at all.

Some wall framing apparatus are known which use a hose feed nail gun apparatus with an adjustable height for the placement of nails in the braces relative to a fabrication bed. These apparatus have a ram which drives a nail which is dropped in front of the ram into the timber. The nail hose is fed by a 'tumbler' which agitates a box supply of loose nails into a feeder for the nail supply hose. The nail ram is pivotally mounted with the pivot at some distance from the frame being fabricated so the position of the nails in the brace can be adjusted by pivoting the nail gun.

While the pivoting allows the position of entry of nails into a brace to be adjusted, it suffers a problem that the nails will not be aligned with the brace. Instead, the nails will radiate from the pivot.

Another problem with this apparatus is that the pivot needs to be some distance from the frame being fabricated if the nail is not to be at too obtuse an angle of the axis of the brace. This pivot arrangement requires a considerable amount of space which places design constraints on the fabrication apparatus and may require a considerable amount of factory floor space.

A further disadvantage of the above prior art devices is that they are configured with a fixed position switch which confines the operator to one location.

This increases the travel time around the working area as the operator is required to return to the central position of the machine to the press switch. Also, hands free operation is not possible when the operator is required to push the switch. This can lead to an inaccuracy of work when lining marks up on the timber.

It is an object of the present invention to provide an apparatus for fabricated frames which overcomes or mitigates some of the aforementioned problems with existing apparatus for fabrication of frames, or at least to provide the public with a useful choice in apparatus for fabrication of frames.

It is a further object of the present invention to provide an apparatus for fabrication of frames in which the nailing of braces to frames is provided and which utilises a minimal number of nail guns and also allows relatively large scale supply of nails without the need for frequent replacement of nail supplies.

It is a further object of the present invention to provide an apparatus for fabrication of frames that allows a relatively large supply of nails to be supplied to nail guns in a relatively compact form.

It is a further object of the present invention to provide an apparatus for fabrication of frames which allows adjustment of the elevation of the position of the nails relative to a fabrication and uses a nail belt to supply the nail gun.

As used herein the term 'brace' should be understood to refer to any framing perpendicular to the plate(s) of the frame.

As used herein the term 'nail belt' refers to a plurality of nails attached together for feeding and handling purposes but suitable for supplying the nails to a nail gun.

As used herein the term 'coil' used in conjunction with 'nail belt' includes a roll, spool, reel or such like of the nail belt. It is envisaged that the term also includes the nail belt being flaked. Here flaked refers to a zig-zag stacking of successive layers of the belt.

As used herein a 'single nailing operation' includes the addition of nails in combination to a frame even if the nails are added sequentially. For example, pairs of nails may be used to provide additional strength.

As used herein, the terms 'horizontal' and 'vertical' or grammatical variations mean substantially horizontal and substantially vertical so that minor variations or deviations from horizontal or vertical are included. Also, the terms refer to alternative alignments or orientations to 'horizontal' or 'vertical' where alternative provisions for gravity are apparent to those skilled in the art.

As used herein, the term 'planar' and 'selected plane' refers to a plane in which a frame or a side of a frame might be considered to lie. A frame formed from members is considered to be able to lie in a given plane even though the members have finite width and spaces are formed between members in that frame.

As used herein, the term 'processor' refers to a computer, microprocessor, microcontroller, programmable logic device or any other processor known to those skilled in the art. The term 'processor executable instructions' stored on a processor readable medium is intended to include any instructions or configurable information that is readable by the 'processor'. This may include a medium as simple as gates or switches of a programmable logic device circuit.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to a first aspect of the present invention there is provided an apparatus for frame fabrication including:

at least one nail gun adapted to fire nails substantially in a selected plane of the frame characterised in that, the nail gun translates vertically and is configured with a control input device activated by an operator which extends substantially across the width of the frame fabrication apparatus.

Preferably, the vertical translation of the nail gun facilitates feeding the nail gun by a nail coil. This also facilitates a compact wall framing machine that is easy to reload with a large number of nails rather than pivoting vertically.

Preferably, the apparatus includes a nail supply means to supply nails to the at least one nail gun, the nail supply being adapted to supply a belt of nails to the at least one nail gun.

Preferably, the apparatus includes at least one mounting for a nail gun.

Preferably, the at least one mounting is adapted to translate the nail gun perpendicular to said selected plane of the frame.

Preferably, said selected plane of the frame is horizontal and at least one mounting is adapted to translate the nail gun vertically.

Preferably, the nail supply means includes a coiled nail belt.

Preferably, the coiled nail belt comprises more than approximately 1000 nails.

Preferably, the coiled nail belt comprises approximately 2500 or more nails.

Preferably, the nail supply means is adapted to rotate about a central axis which is horizontal to allow said coiled nail belt to unravel.

Preferably, the apparatus includes a nail belt feeder to feed the nail belt to the at least one nail gun, the feeder adapted to force nails in the belt towards the at least one nail gun.

Preferably, the nail belt feeder is adapted to absorb any tension in the nail belt in a direction away from the nail gun.

Preferably, the nail belt feeder includes at least one engagement means and at least one actuator for said engagement means, said engagement means and actuator being adapted so that the engagement means is reciprocated over the nail belt by the actuator such that the engagement means engages nails in the belt in a direction towards the nail gun.

Preferably, the at least one engagement means comprises at least one claw.

Preferably the apparatus includes a mounting for the coiled nail belt.

Preferably, the mounting includes a barrel on which the coiled nail belt may be mounted.

Preferably, the barrel is arranged to rotate around an axis which lies substantially in a horizontal plane.

Preferably, said mounting includes a means for providing resistance to the rotation of said coiled nail belt at least in the unravelling rotational direction of the coil.

This resistance allows a coil to be mounted with its central axis in a horizontal plane. This, in turn, allows the vertical position of the nail gun to be adjusted while still being fed by a coiled nail belt. If resistance was not provided for the coiled nail belt, the coil would unravel due to the weight of the nails.

Preferably, the apparatus for frame fabrication includes at least one primary clamping surface adapted to clamp the frame in a selected plane of orientation of the frame.

Preferably, said selected plane is horizontal and the at least one primary clamping surface is adapted to act horizontally.

The primary clamping surface clamps a brace in place between two plates.

Preferably, the apparatus for frame fabrication includes at least one secondary clamping surface adapted to clamp members of the frame into alignment into a selected plane of orientation of the frame.

Preferably, said plane is horizontal and the secondary clamping surface is adapted to clamp members of the frame into vertical alignment.

Preferably, said at least one secondary clamping surface is adapted to clamp at least one brace and plate into vertical alignment so they both lie flush in the horizontal plane of the frame.

Preferably, the apparatus for frame fabrication includes a controller adapted to control at least one of:

the at least one nail gun;

the at least one nail gun mounting;

the at least one primary clamping surface; and the at least one secondary clamping surface.

Preferably, the apparatus for frame fabrication includes a control input device for the controller.

Throughout the present specification the term 'control input device' should be understood to mean a mechanism to activate the machine by an operator. It is envisaged the control input device may come in a variety of different forms such as an infrared beam, bar, or the like.

Preferably, the control input device includes a bar provided with an eccentric pivot and detectors adapted to detect when said bar has been pivoted to an activation position.

Throughout the present specification the term 'bar' should be understood to mean a rigid, substantially straight length of material that extends across most of the width of the wall framing apparatus.

For ease of reference the bar may simply be referred to as a control bar, kick bar, activation bar and/or clamping bar.

Preferably the control bar is used to trigger the controller to arrange a sequence of clamping or unclamping, nail gun translation and firing operations if programmed as determined by the operator. These operations nail the plate to the brace.

Preferably, the control bar is actuated by an operator's knee (hands free) at the position where an operator might stand to place the brace. Hands free operation of the control bar also allows the operator to place and nail noggins.

However, this should not be seen as a limitation on the present invention as conceivably a hand or any other part of the body may be used by the operator, to activate the control bar.

Preferably, the control bar is returned to the deactivation (down) position by gravity and triggers an industrial micro switch when lifted to activate the apparatus as aforesaid. In this way it acts a double safety mechanism with the sensor (described below) as the machine is not live and will not fire until the control bar has been engaged.

Preferably, said at least one pivot is provided with a stopper which limits the pivotal motion under gravity.

Preferably, the controller is adapted to store at least one preset translation position of the nail gun.

Preferably, the preset translation position includes pairs of translation positions that correspond to pairs of nails to be added to a frame substantially in a single nailing operation.

Preferably, the apparatus for frame fabrication includes at least one support for framing members.

Preferably, at least one portion of the support is adapted to provide a predetermined degree of friction between said support and said framing member.

Preferably, said portion of said support comprises embossed paint.

Preferably, the controller is adapted to initiate a series of events in a nailing operation upon activation of said control input device.

Preferably, the controller is adapted to initiate the following series of events in a nailing operation:

said mounting for the nail gun translates the nail gun to a first preset nailing position;

said nail gun fires a nail.

Preferably, said series of events is followed by:

the said mounting for the nail gun translating the nail gun to a second preset nailing position; and said nail gun fires a second nail.

Preferably, said series of events is preceded with clamping of the frame by said primary and/or secondary clamping surfaces.

Preferably, the apparatus for frame fabrication includes a sensor and interlock adapted to:

provide a sensor signal;

detect the presence or absence of a return sensor signal; and prevent firing of nails from the nail gun in response to the presence or absence of the return sensor signal.

Preferably, the sensor signal is provided and detected in the proximity of a part of the nail gun from which the nails emerge.

According to another aspect of the present invention there is provided a method of frame fabrication including the steps of:

1. providing at least one nail gun adapted to fire nails substantially in a selected plane of the frame,
2. positioning a plate at a desired point along a length of the frame apparatus, and
3. positioning a brace in relation to the plate and fabrication apparatus, characterised by the steps of:

1. activating a control input device which extends substantially across the width of the frame fabrication apparatus, and
2. allowing the control input device to deactivate.

Preferably, the control input device is a control bar and the aforesaid method is characterised by the steps of:

1. lifting the control bar to activate the apparatus and to trigger a controller which initiates a set of processor executable instructions, and
2. allowing the control bar to fall back to its original position under gravity thereby deactivating the apparatus.

Preferably, the frame is substantially planar having a primary plane and the selected plane is substantially the primary plane of the frame.

Preferably, the method of manufacture includes at least one mounting for the nail gun, said mounting being adapted to translate the nail gun perpendicular to said selected plane of the frame.

According to a third aspect of the present invention, there is provided an apparatus for frame fabrication configured with a control input device activated by an operator which extends substantially across the width of the frame apparatus, said apparatus including:

a controller with a set of processor executable instructions stored on a processor readable medium adapted to carry out the following steps:

receive a user control input from a control bar;

provide control signals for a nail gun mounting to adjust the position of a nail gun to a first preset position;

provide control signals to a nail gun to fire a nail.

Preferably, the processor executable instructions are further adapted to carry out the steps of:

providing a control signal to the nail gun mounting to move the nail gun to a second preset position; and providing a control signal to the nail gun to fire a nail.

Preferably, the processor executable instructions are further adapted to carry out the following steps:

providing control instructions to activate a first and/or second clamp in a predefined order or simultaneously.

Preferably, the processor executable instructions are further adapted to:

communicate with a sensor indicating that a return signal meets predetermined criteria; and inhibit any control signal to a nail gun to fire a nail if said predetermined criteria are not met.

There are a number of advantages associated with this invention:

The control bar can be knee or hand operated and extends across most of the width of the wall frame machine. It replaces a fixed position switch which confines the operator to one location, and allows the operator to use his or her hands to manually position the components to be nailed.

This is a faster, more efficient way for an operator to clamp the timber in position prior to filing the nail guns.

Specifically, the advantages of the control bar switch over a fixed position switch are as follows:

1 The wood can be clamped from any location due to the length of the clamping bar switch.
2 The switch can be hand or knee operated.
3 The operator is able to keep both hands free for positioning of timber which improves accuracy of work by allowing the operator to line up marks on the timber.
4 Keeping both hands free speeds up the process by reducing the need to reposition timber after clamping as it is generally positioned and clamped correctly the first time.
5 The operator saves travel time around the working area by reducing the need to return to the centre position of the machine to press the clamp or nailing switch.
6 The machine is not live and will not fire until the control bar has been engaged, thus it is a double safety mechanism with the sensor.
7 Furthermore, the vertical translation of the nail gun facilitates feeding a gun by a nail coil and also facilitates a compact wall framing machine that is easy to reload with a large number of nails.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
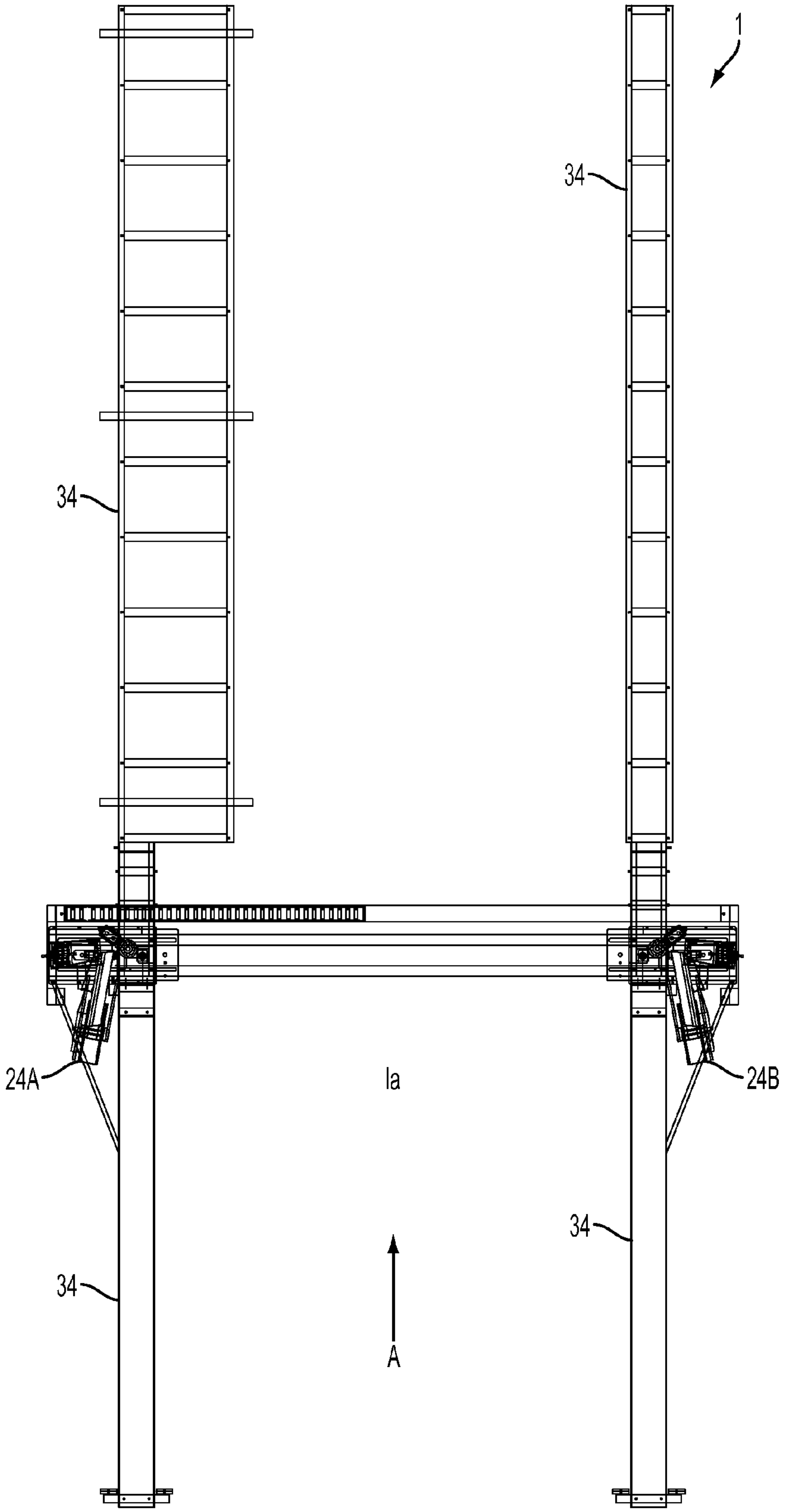
FIG. 1: shows a schematic plan view of a frame fabrication apparatus according to a preferred embodiment of the present invention.

Referring to FIG. 1, there is shown a frame fabrication apparatus as generally indicated by arrow 1. The apparatus 1 has a work area 1*a* for an operator (not shown) who would move a frame (not shown) in direction A as it is being fabricated.

The apparatus 1 has a pair of frame supports 34 at either side of the apparatus 1.

The apparatus also has a pair of clamping and nailing stations 5*a* and 5*b* part way down the length of the apparatus 1. The primary purpose of the clamping and nailing stations is to nail braces (not shown) to plates (not shown) in a frame.

Figure 2:
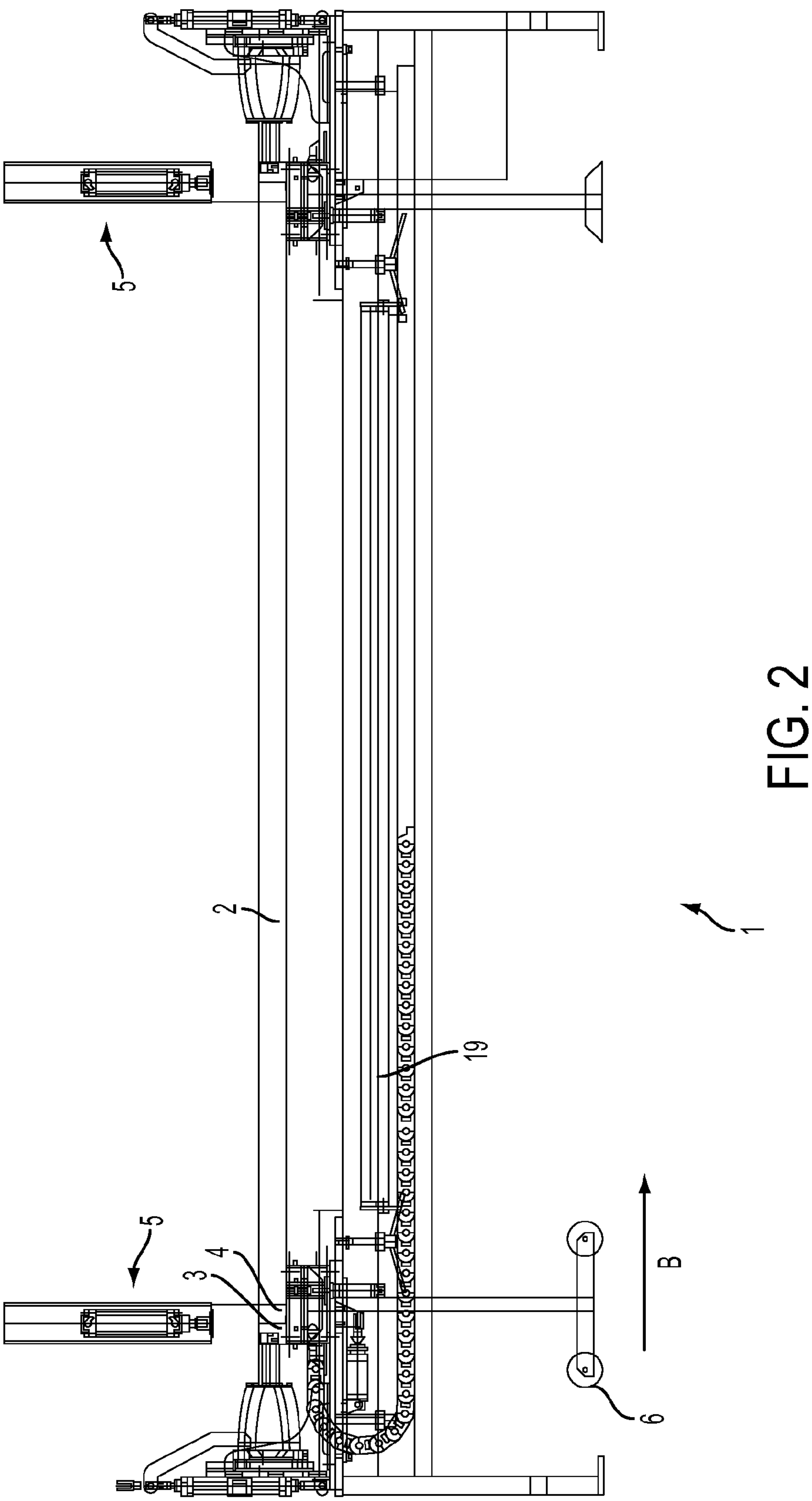
FIG. 2: shows a side elevation of a section of a frame fabrication apparatus according to the same preferred embodiment of the present invention as FIG. 1.

Referring to FIG. 2 there is shown an end elevation of the same frame fabrication apparatus 1. A frame 2 is shown in place on the apparatus. The frame has a plate 3 and a brace 4. The frame fabrication apparatus 1 has a clamping and nailing station 5 at one side of the apparatus. This clamping and nailing station 5 is positioned approximately mid way down the length of the frame fabrication apparatus 1. The clamping and nailing station 5 is adjustable in direction B to accommodate different widths of frame 2. A dolly 6 is provided to support the clamping and nailing station 5 and allow movement in the direction B.

Figure 3:
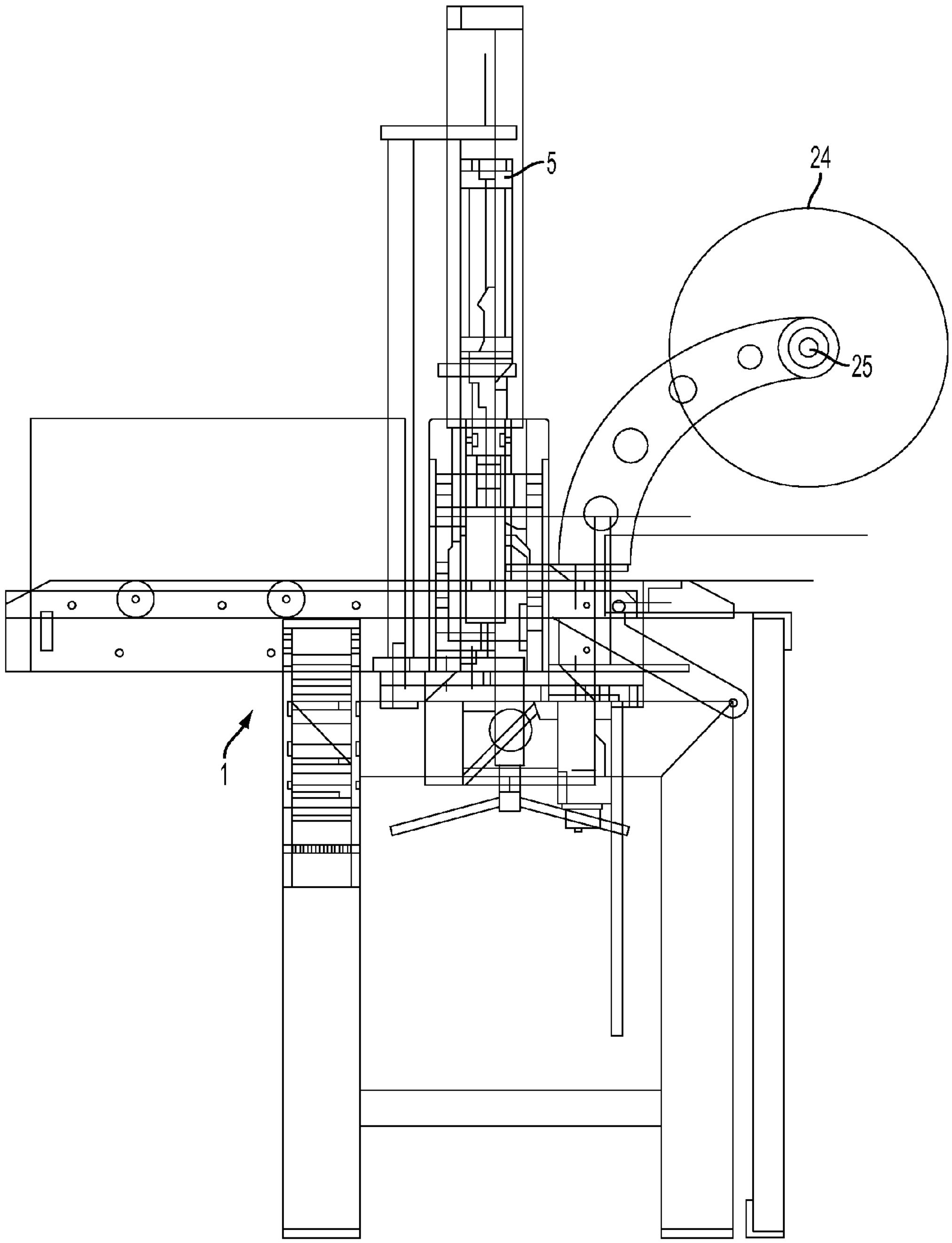
FIG. 3: shows an end elevation of a section of a frame fabrication apparatus centred on a nail gun according to the same preferred embodiment of the present invention as FIGS. 1 and 2.

FIG. 3 shows a side elevation of a portion of the frame fabrication apparatus 1 centred on the clamping and nailing station 5. FIG. 3 shows a mounting 24 for a coiled nail belt (not shown). The nail belt mounting 24 spins on a horizontal axis 25.

Figure 4:
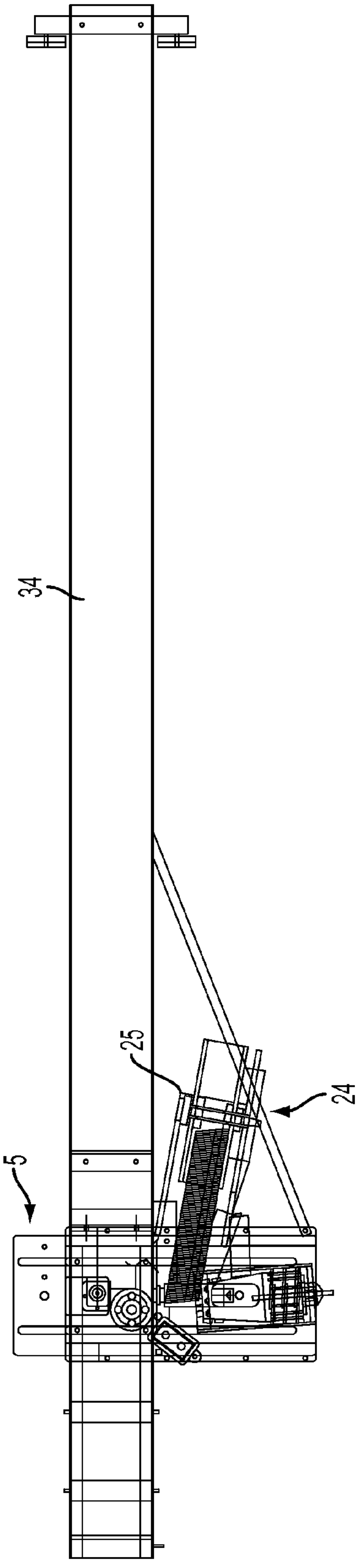
FIG. 4: shows a plan view of a section of a frame fabrication apparatus according to the same preferred embodiment of the present invention as FIGS. 1 to 3.

FIG. 4 shows a plan view of a clamping and nailing station 5.

Figure 5:
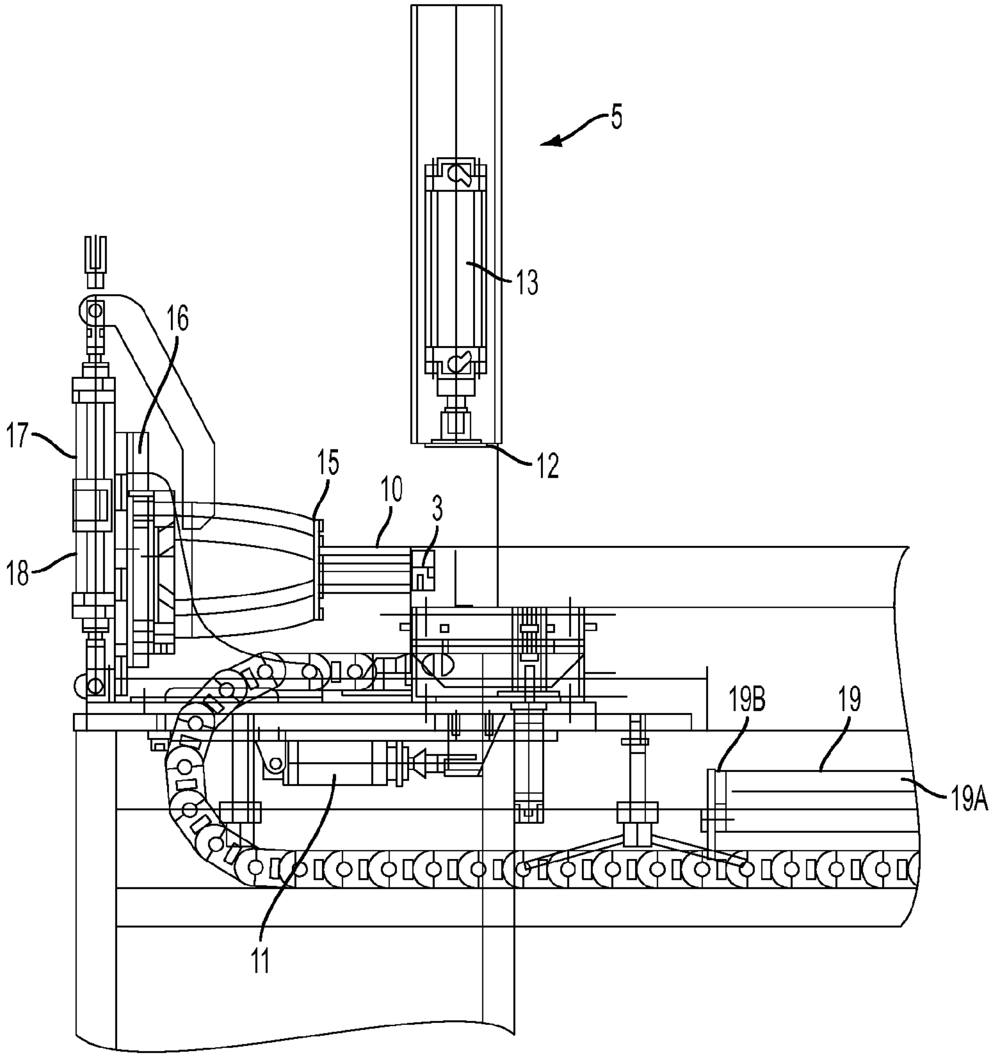
FIG. 5: shows a closer view of FIG. 2 showing detail of the frame fabrication apparatus according to the same preferred embodiment of the present invention as FIGS. 1 to 4.

FIG. 5 shows a close-up end elevation of the clamping and nailing station 5. This station has a horizontal clamping surface 10 which is driven by a horizontal clamping actuator 11 and moves in the direction indicated by arrow A. The action of this clamping surface 10 and actuator 11, in conjunction with a reciprocal clamping surface (not shown) at clamping and nailing station 5 is to compress plates 3 against braces 4 prior to nailing. The clamping and nailing station 5 also has a vertical clamping surface 12 and a vertical clamping actuator 13 to clamp the plate 3 and brace 4 into position prior to nailing.

The nails that fix the plate 3 to the brace 4 are provided by a nail gun 15. The nail gun 15 is bolted to a nail gun mounting 16. The nail gun mounting 16 is provided with a tandem pair of actuators 17 and 18 which allow the mounting 16 or translate the nail gun 15 vertically. The mounting 16 has a pair of vertical rails (not shown) along which part of the nail gun mounting slides (also not shown). The use of a tandem pair of actuators allows for a greater number of preset vertical positions to be achieved. The vertical adjustment feature of the nail gun mounting 16 allows the elevation of the nail gun mounting to be adjusted.

This allows the nail gun 15 to place nails at a number of different elevations to be used to drive in pairs of nails into the same position down the length of the frame but at slightly different elevations. Pairs of nails might simply be used to add strength to the frame.

The frame fabrication apparatus 1 also has a controller (not shown) for the nail gun mounting actuators 17 and 18, horizontal press actuator 11, and vertical press actuator 13.

The frame fabrication apparatus 1 also has an activation bar 19 which is provided to activate a pressing and nailing sequence for the clamping and nailing station 5. The activation bar 19 is shown in FIG. 2 as extending across a large part of the width of the frame fabrication apparatus 1. The activation bar 19 is located at a suitable height and position for a person operating the apparatus 1 to control the bar with their knees.

Figure 6:
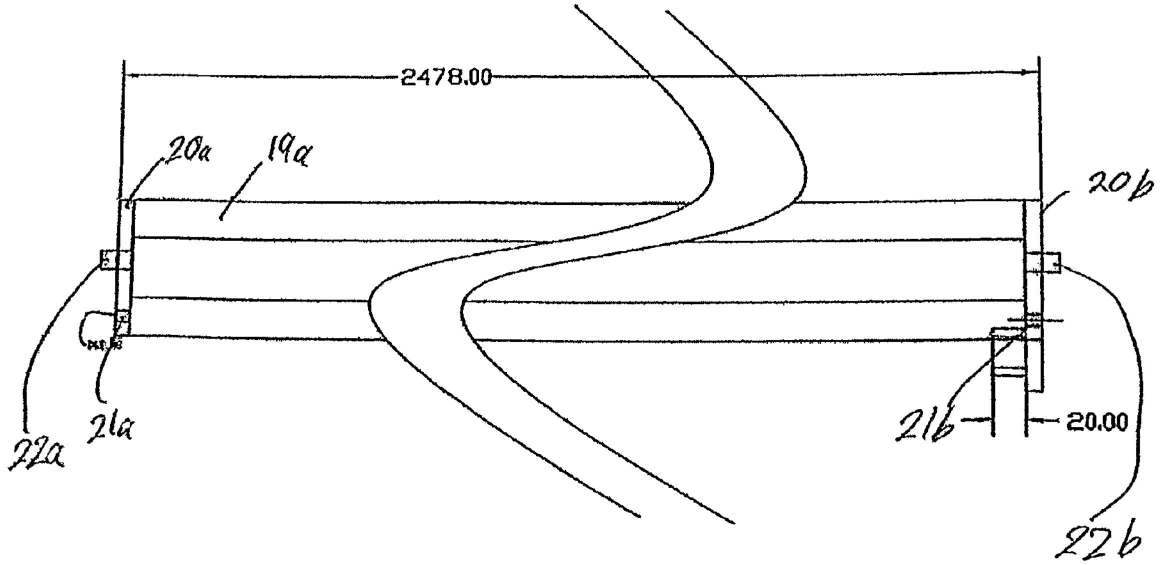
FIGS. 6 and 6A: show a control interface bar of a frame fabrication apparatus according to the same preferred embodiment of the present invention as FIGS. 1 to 5.
Figure 6A:
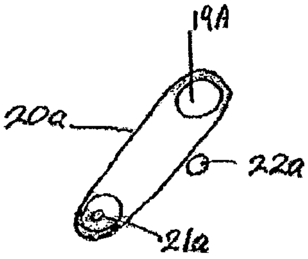

A control input device in the form of a bar 19 is shown in FIGS. 6 and 6A.

Typically, the person operating the apparatus 1 would lift the upper bar 19A and then let it fall back to its original position under gravity. The upper bar 19A or part of its hinge typically includes micro switches which act as a control input for the controller (not shown). The activation bar 19 is shown in more detail in FIG. 6. The bar 19*a* is connected by a pair of members 20*a* and 20*b* to a pair of pivots 21*a* and 21*b*. In a resting (deactivated) position the bar sits against a pair of stoppers 22*a* and 22*b*.

The operation of the clamping and nailing station 5 is illustrated by the following example given in reference to FIG. 2. An operator of the frame fabrication apparatus 1 can position the plate 3 at a desired point along the length of the frame fabrication apparatus 1. The operator can then add a brace 4 and satisfied that the brace 4 is in the correct position, the operator would bump the kick bar 19 with their knee, for example.

This would initiate the controller (not shown) to move the clamping surface 10 inwards against an opposite pressing surface (not shown). This action compacts the plate 3 against the brace 4.

The controller then activates the pressing surface 12 actuated by the actuator 13 to press downward on the adjacent edges of the plate 3 and brace 4. This action ensures that the plate 3 and brace 4 are properly aligned vertically so that they both lie flush in the desired plane of the frame. The controller then activates the nail gun mounting 16 to move the nail gun 15 to a first elevation (which might be one third the height of the plate 3 from the bottom of plate 3). The controller then activates the nail gun to fire a nail which penetrates the plate 3 and the brace 4 to fasten same.

The controller then activates the nail gun mounting 16 to move the nail gun to a position corresponding to a second position (which might be two thirds the height of the plate 3 from the bottom of plate 3) and activates the nail gun 15 to place a nail in that position. At this point, there are two nails approximately one third and two third the height of the plate 3 extending through the plate 3 into the brace 4. The controller then activates the pressing surface 10 driven by the actuator 11 to move outward and the clamping surface 12 driven by the actuator 13 to move upwards so that the frame is released and the operator is able to move the frame further down the frame fabrication apparatus to place the next brace 3, for example.

Figure 7:
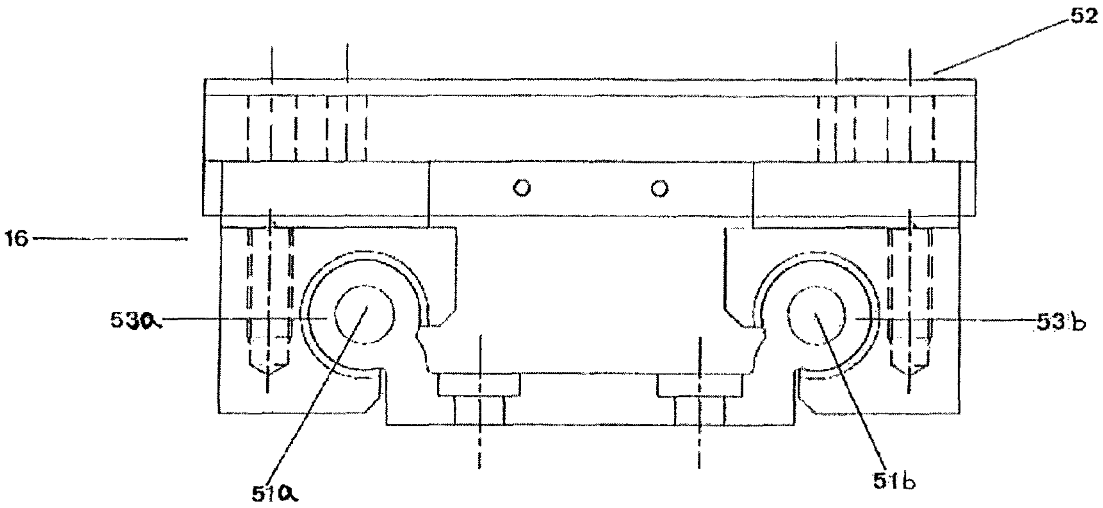
FIG. 7: shows a plan view of a mounting for a nail gun according to the same preferred embodiment of the present invention as FIGS. 1 to 6.
Figure 8:
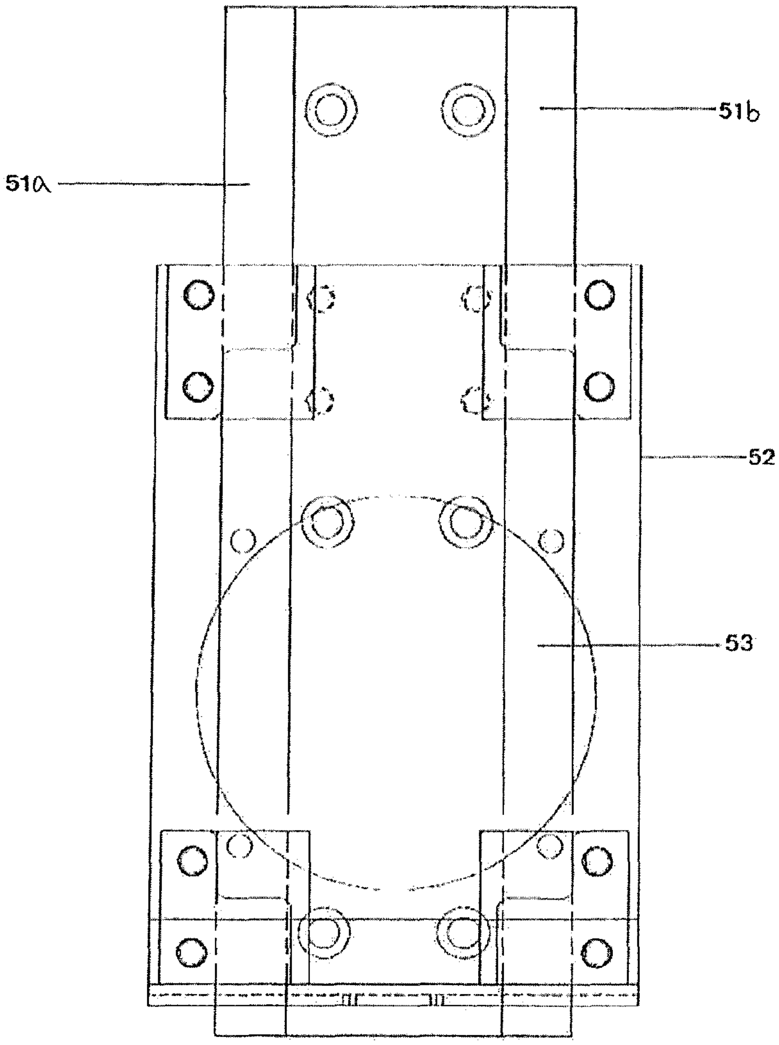
FIG. 8: shows a front elevation of a mounting of a nail gun according to the same preferred embodiment of the present invention as FIGS. 1 to 7, FIG. 9: shows a side elevation of a mounting for a nail belt according to the same preferred embodiment of the present invention as FIGS. 1 to 8.

Referring to FIGS. 7 and 8 we see a side elevation and plan view of a nail gun mounting 16. The mounting 16 has a pair of vertical rails 51*a* and 51*b*. A movable stage 52 of the nail gun 16 slides along the rails 51*a* and 51*b*. The movable stage 52 has tracks 53*a* and 53*b* which are shaped to accommodate the rails 51*a* and 51*b*.

FIG. 8 shows an elevation of the mounting 16 with rails 51*a* and 51*b* and movable stage 52. The circle 53 depicts the position a mounted nail gun might take.

Figure 9:
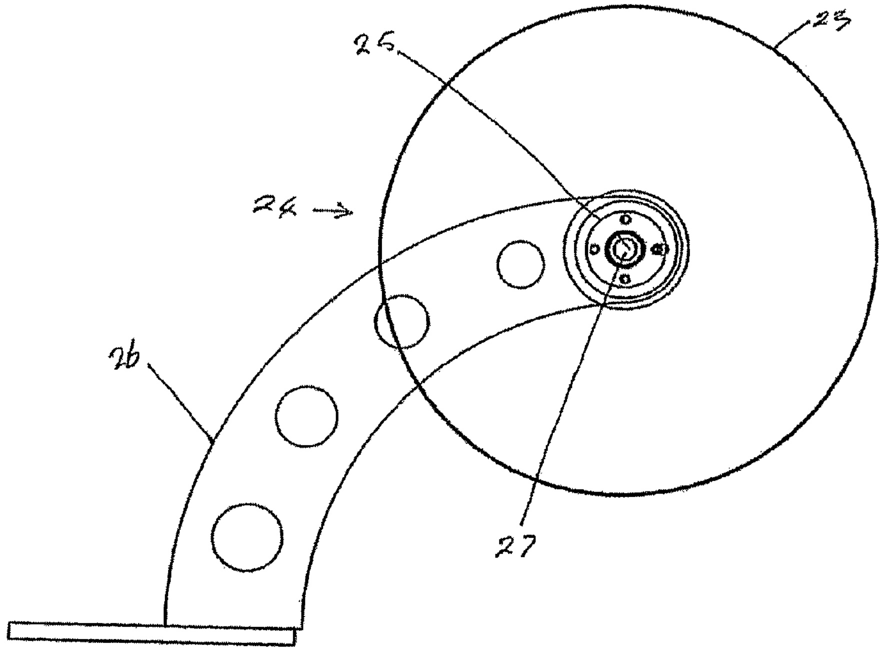
Figure 10:
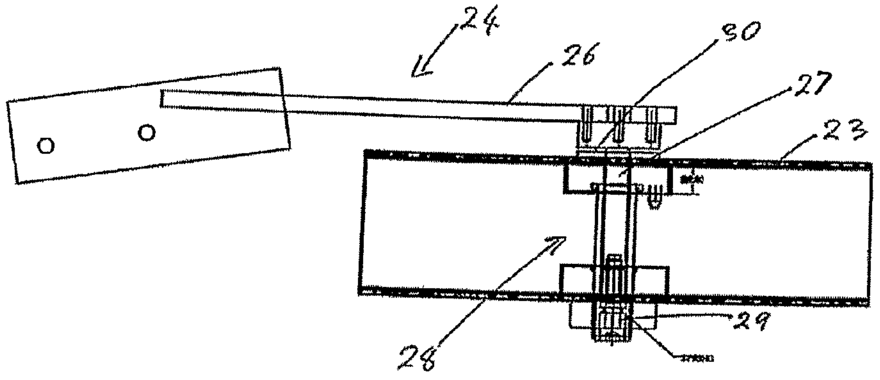
FIG. 10: shows a plan view of a mounting for a nail belt according to the same embodiment as FIGS. 1 to 9.

FIG. 9 shows a side elevation of the nail belt mounting 24 which has a mounting member 26 for an axle 27 in the horizontal axis 25 of the nail belt mounting 24. FIG. 10 shows a plan view of the same nail belt mounting 24. The nail belt mounting 24 has a braking system 28 which prevents the weight of the nail belt (not shown) unravelling itself from the mounting 24 by simply spinning the barrel 23 on the axle 27.

The braking system 28 has an adjustment bolt 29 which is fitted inside a coil spring (not shown). Adjusting the adjustment bolt 29 will cause the face of the barrel 23 closest to the mounting member 26 to press, with varying pressure on a brake pad 30. Therefore, the adjustment bolt 29, spring (not shown), barrel 23 and brake pad 30 form an adjustable friction clutch. This clutch allows the nail belt coil (not shown) to be mounted with a horizontal rotational axis 25 rather than having to have a vertical axis rotation to avoid the nail belt coil (not shown) unravelling under its own weight. This in turn allows a nail belt coil to be used to supply a nail gun 15 which moves vertically while firing nails horizontally. This has the advantage of a single nail gun being used to place pairs of nails into each brace.

Figure 11:
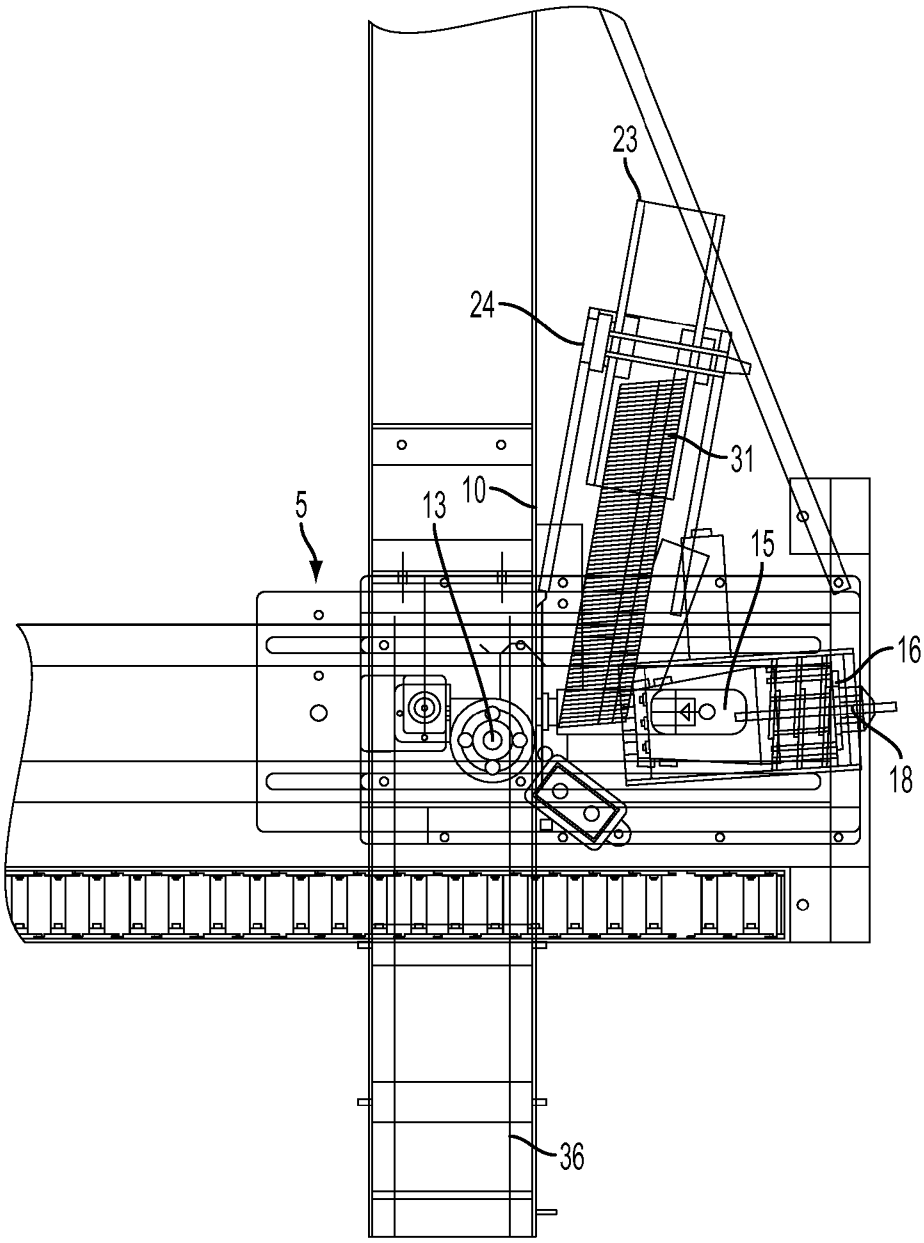
FIG. 11: shows a plan view of FIG. 4 showing detail of the frame fabrication apparatus according to the preferred embodiment of the present invention as FIGS. 1 to 10.

FIG. 11 shows a plan view of the same clamping and nailing station 5 as depicted in the previous figures. FIG. 11 shows the actuator 13, for the vertical pressing surface 12 (not shown), and the clamping surface 10. The nail gun 15 which is mounted on the nail gun mounting 16 which has an upper vertical actuator 18 and lower vertical activator (not shown). The nail belt 31 extends from a nail belt coil mounted on a barrel 23 of the nail coil (not shown) mounting 24. Vertical movement of the nail gun 15 does not affect the feed of the nail belt 31 to the nail gun 15.

The frame fabrication apparatus 1 has a support rail 34 at one side of the clamping and nailing station 5 into which the plates are feed. The purpose of the rail is to support the plates 3 as they are fed into the clamping and nailing station 5. The support 34 has a surface 35 which is provided with embossed paint. This creates a suitable level of friction between the plate 3 and the surface 35 for the plates to be slid by an operator towards the clamping and nailing station 5 yet avoid overrun of the plates past a desired position in respect to the clamping and nailing station 5. Suitable embossed paint will be apparent to those skilled in the art and/or from routine experimentation. Support rail 34 extends below the clamping and nailing station 5 to the side from which the nailed brace emerges. Typically, this side of the support is provided with rollers 36 to facilitate movement.

Figure 12:
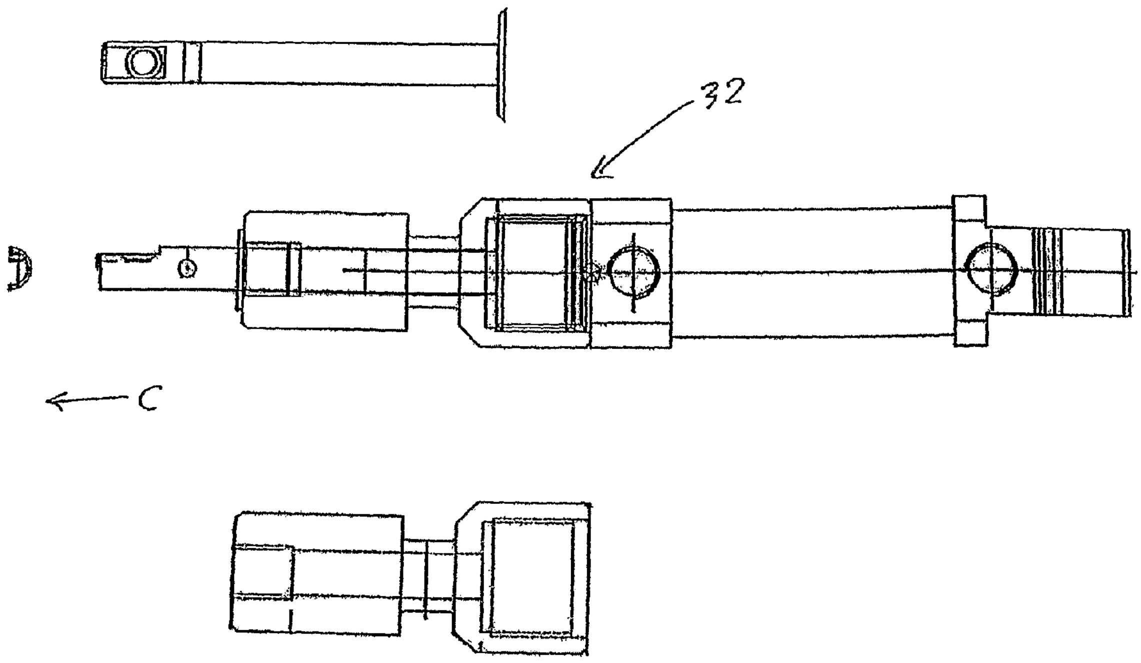
FIG. 12: shows an actuator for a nail belt feeder for a nail gun according to the same preferred embodiment of the present invention as FIGS. 1 to 11.

FIG. 12 shows an actuator 32 which is used to feed the nail belt 31 from the nail coil mounting 24 to the nail gun 15. This actuator is provided with a standard nail belt feed claw mechanism which pulls on the nails in a direction towards the nail gun 15 each time the actuator is extended in direction C and which slide over the nails when the actuator 32 is retracted in the opposite direction to C. By extending and retracting the actuator 32, the nails in the nail belt 31 are progressively pulled towards the nail gun 15. The controller also activates the nail belt feed actuator 32 and it will be apparent to the skilled addressee when such activation is required. For example, it may be immediately after each firing of a nail.

Figure 13:
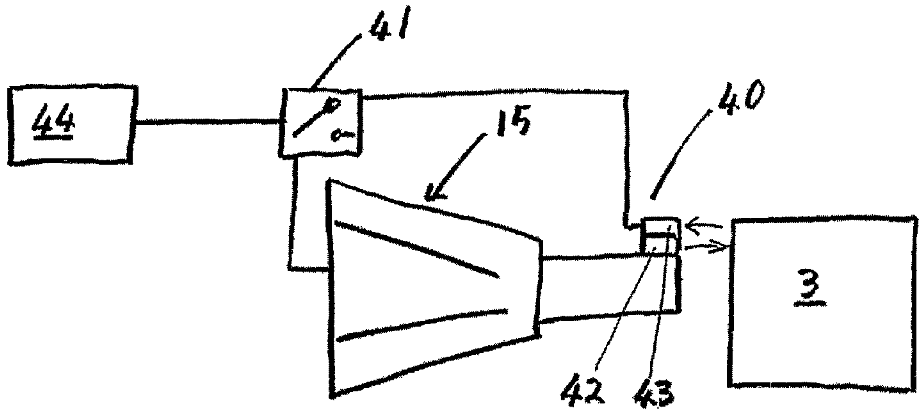
FIG. 13: shows a schematic view of a sensor interlock according to the same preferred embodiment of the present invention as FIGS. 1 to 12.

FIG. 13 shows a schematic diagram of a nail gun 15 provided with a sensor 40 and sensor interlock 41. The sensor 40 has a transmitter 42 and receiver 43. The transmitter transmits a signal which is reflected from an object to be nailed such as a plate 3, for example. The reflected signal is detected by the receiver 43 which activates the interlock 41 to allow a signal from part of the controller 44. If a return signal is not detected by the receiver 43, the controller will not be allowed to fire the nail gun 15. This arrangement of interlock ensures that an object is in close proximity to the nail gun 15 before a nail can be fired. This avoids the possibility of a nail being fired if there is not an object 3 to receive the nail. This in turn prevents nails being projectile hazards. It will be understood by those skilled in the art that the interlock may be integral with the controller (not shown). It will be apparent to the skilled addressee when and how the controller (not shown) should communicate with the sensor. For example, the sensor may continually update a controller register which is rolled before any firing signal is sent to a nail gun 15. Alternatively, an interlock and type functionality may be introduced between the controller and the nail gun to block signals when the sensor does not receive a satisfactory return signal.

Also apparent to the skilled addressee how the return signal is evaluated. In one example, the transmitter 42 and receiver 43 might be calibrated and thereby locally determine whether the return signal is satisfactory. Alternatively, the controller (not shown) may receive raw data from the receiver 43 and compare it with stored criteria.

Aspects of the present invention have been described by way of example only and it should be appreciated that modifications and additions may be made thereto without departing from the scope of the appended claims.

I claim:

1. An apparatus for frame fabrication, said apparatus comprising:

a controller adapted to control at least one of:
- at least one nail gun;
- at least one nail gun mounting;
- at least one primary clamping surface;
- at least one secondary clamping surface; and a control input device to be activated by an operator, said control input device extending across more than a half of the width of the frame fabrication apparatus and arranged for triggering the controller upon activation by the operator, wherein the control input device is a control bar that is configured to be lifted to activate the apparatus and to trigger the controller and to fall back to its original position under gravity thereby deactivating the apparatus.

2. An apparatus for frame fabrication as claimed in claim 1, wherein the control bar is horizontal and is at a knee height level in its original position.

* * * * *